(12) United States Patent
Joerg et al.

(10) Patent No.: US 11,976,796 B2
(45) Date of Patent: May 7, 2024

(54) MOTOR VEHICLE LIGHTING DEVICE

(71) Applicant: VALEO VISION, Bobigny (FR)

(72) Inventors: Alexandre Joerg, Bobigny (FR); Pierre Renaud, Bobigny (FR)

(73) Assignee: VALEO VISION, Bobigny (FR)

( * ) Notice: Subject to any disclaimer, the term of this patent is extended or adjusted under 35 U.S.C. 154(b) by 131 days.

(21) Appl. No.: 17/627,619

(22) PCT Filed: Jul. 2, 2020

(86) PCT No.: PCT/EP2020/068621
§ 371 (c)(1),
(2) Date: Jul. 20, 2022

(87) PCT Pub. No.: WO2021/008880
PCT Pub. Date: Jan. 20, 2021

(65) Prior Publication Data
US 2022/0373148 A1 Nov. 24, 2022

(30) Foreign Application Priority Data
Jul. 16, 2019 (FR) ..................................... 19 07988

(51) Int. Cl.
*F21S 41/25* (2018.01)
*F21S 41/29* (2018.01)
(Continued)

(52) U.S. Cl.
CPC .............. *F21S 41/25* (2018.01); *F21S 41/29* (2018.01); *F21S 43/255* (2018.01); *F21S 43/27* (2018.01); *B60Q 1/0023* (2013.01)

(58) Field of Classification Search
CPC . F21S 41/25; F21S 41/29; F21S 41/50; B60Q 1/0023
See application file for complete search history.

(56) References Cited

U.S. PATENT DOCUMENTS 7,345,414 B1 * 3/2008 Miller ..................... H01J 61/35
313/489
10,120,074 B2 * 11/2018 Kasaba ................. G01S 7/4813
(Continued)

FOREIGN PATENT DOCUMENTS

DE 10 2017 109 905 A1 11/2018
DE 10 2017 218 683 A1 4/2019
(Continued)

OTHER PUBLICATIONS

International Search Report dated Sep. 4, 2020 in PCT/EP2020/068621 filed on Jul. 2, 2020.

*Primary Examiner* — Zheng Song
(74) *Attorney, Agent, or Firm* — Oblon, McClelland, Maier & Neustadt, L.L.P.

(57) ABSTRACT

A lighting device for a motor vehicle includes a cavity, at least one illumination source arranged in the cavity, and at least one detection system which is arranged in the cavity and includes an emitter and/or a receiver designed to transmit and receive electromagnetic waves in a predetermined wavelength range. The lighting device includes a trim arranged in the cavity and behind which the emitter and/or the receiver of the detection system are arranged. The trim includes an interference filter which is transparent in transmission at wavelengths in the predetermined wavelength range and is reflective for the wavelengths transmitted in the visible spectrum.

20 Claims, 1 Drawing Sheet

(51) Int. Cl.
    *F21S 43/20*      (2018.01)
    *F21S 43/27*      (2018.01)
    *B60Q 1/00*       (2006.01)

(56)            References Cited

U.S. PATENT DOCUMENTS 10,421,390 B2 *   9/2019   Hara ..................... G01S 7/4813
 2010/0141765 A1      6/2010   Capello et al.
 2010/0328926 A1 *   12/2010   Hoelen ................ C09K 11/778
                                                               362/84
 2011/0063115 A1 *    3/2011   Kishimoto ................ F21K 9/00
                                                              250/206
 2018/0045826 A1 *    2/2018   Kasaba .................. B60Q 1/302
 2018/0229645 A1      8/2018   Hara et al.
 2018/0231206 A1 *    8/2018   Hara ....................... F21S 45/10
 2020/0301012 A1 *    9/2020   Yamamoto ............. G01S 15/86
 2021/0292239 A1 *    9/2021   Kiyota ................... C04B 35/10

FOREIGN PATENT DOCUMENTS

EP           0 526 424 A2      2/1993
 EP           2 196 792 A1      6/2010
 FR           3 062 892 A1      8/2018
 FR            3088597     *    5/2020    ........... B60Q 1/0023

\* cited by examiner

[Fig. 1]
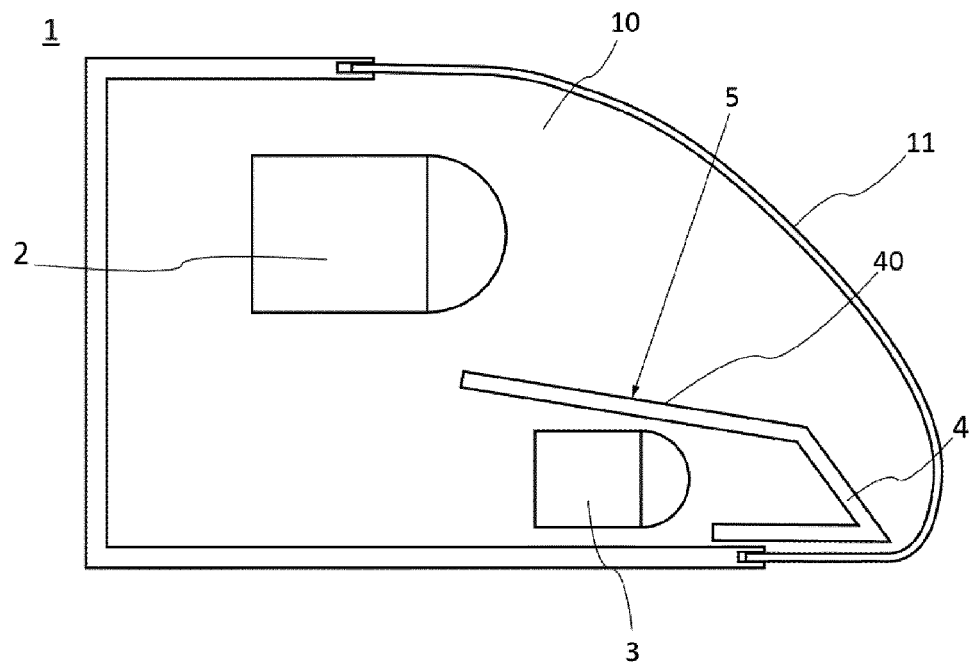
[Fig. 2]
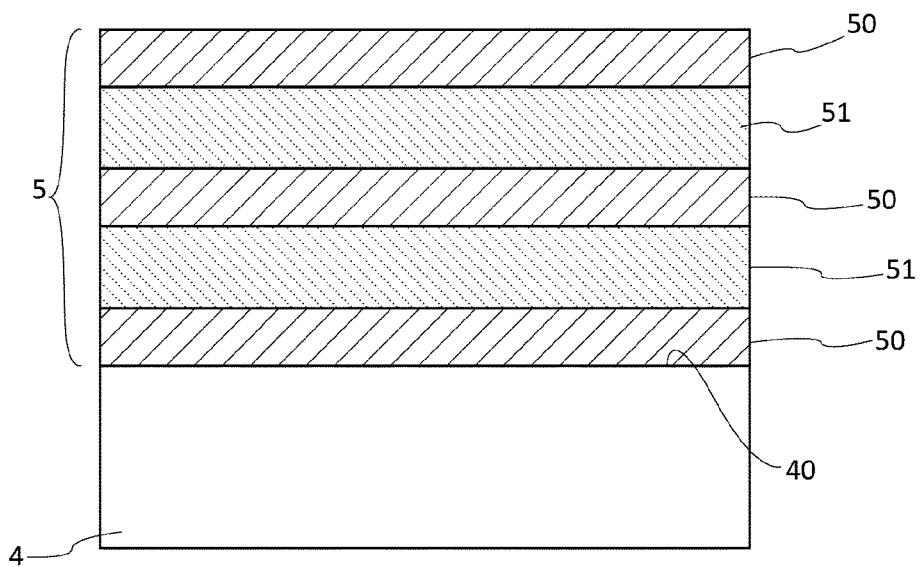

MOTOR VEHICLE LIGHTING DEVICE

The invention relates to the field of automotive lighting and/or automotive signaling.

The invention relates to the exterior lighting of a vehicle, whether at the front, in relation to a headlight, or at the back, in relation to a signaling light.

In the field of automotive lighting and/or signaling devices, lighting modules are known that comprise a body comprising a transparent front wall which can form one or more lenses, at least one shield delimiting the internal volume of the module, and at least one illumination source arranged inside the module and emitting a light beam in the direction of the front wall. The transparent wall is made of plastic or of glass, and is able to let the light rays through without significantly disrupting their direction or their intensity.

Furthermore, vehicles are increasingly equipped with sensors such as detection systems for detecting objects or obstacles on the road. A detection system comprises an element that emits a signal, an element that receives the signal and electronic processing means. Generally, a radar-type detection system is positioned in the bumper of the vehicle so as to be arranged in the exterior region of the vehicle and so as to be visible to ensure the emission-reception function. However, such integration may adversely affect the esthetics of the vehicle and/or its aerodynamic properties, and even the performance of the radar system, the bumper potentially reflecting or absorbing a portion of the radar waves.

To avoid modifying the original design of the vehicle body, it is known practice to integrate a radar system into a lighting device, the radar waves being intended to pass through the transparent front wall of the device. However, such a visible arrangement affects the esthetics of the lighting device.

In addition, it is not conceivable to hide the radar system behind the lighting device, because the metallic coating which covers the inside of the lighting device in order to reflect more light from the light source outward would constitute a barrier to the transmission of the radar waves.

The aim of the invention is therefore to provide a solution for integrating a detection system into a vehicle which does not have the drawbacks of the prior art so as to maintain the esthetics of the vehicle while at the same time not disrupting the transmission, in emission and reception, of the waves of the detection system.

The subject of the invention is thus a lighting device for a motor vehicle, comprising a cavity, at least one illumination source arranged in the cavity (and emitting light rays in the visible spectrum), at least one detection system which is arranged in the cavity and comprises an emitter and/or a receiver designed to transmit and receive electromagnetic waves in a predetermined wavelength range, the lighting device being characterized in that it comprises a trim which is arranged in the cavity and behind which the emitter and/or the receiver of the detection system are arranged, and in that the trim comprises an interference filter which is transparent in transmission at wavelengths in the predetermined wavelength range and is reflective for the wavelengths transmitted in the visible spectrum.

The emitter and the receiver of the detection system may form one and the same module or be formed of two modules positioned adjacently behind the trim. As a variant, only the emitter or the receiver is placed in the lighting device behind the trim, the additional emission or reception module being intended to be arranged in another location of the vehicle.

The detection system is, for example, a radar or a lidar, or the like. Depending on the type of detection system imposed and therefore on its wavelength or its predetermined wavelength range, the interference filter will be selected so as to be transparent in transmission at the wavelengths in the predetermined wavelength range and reflective with regard to wavelengths emitted in the visible spectrum.

Therefore, in order to maintain the esthetics of the lighting device and to provide the detection function, it has been conceived to integrate a detection system into the lighting device, while masking it with a trim placed in front of said detection system without affecting the operation of the latter. The trim is advantageously designed to ensure optimum transmission of the waves out of the vehicle and optimum reception of the return waves. The trim further constitutes a reflective mirror/a reflective filter for light rays in the visible spectrum, and therefore from the illumination source, while being transparent to the wavelengths of the detection system. The stack creates a constructive and destructive interference effect in the layers in order to ensure reflection for some wavelengths and transmission for other wavelengths, ultimately providing a reflective filter whose passband in reflection corresponds to the visible wavelength range.

Thus, the trim, with its property of reflecting light rays in the visible spectrum (therefore from the illumination source), guarantees total reflection of visible light, in particular the lighting device retaining its primary function of illumination without disruption. In addition, the detection system remains operational in emitting and/or receiving the emitted or received waves depending on the integration of an emitter and/or a receiver behind the trim. Lastly, the trim makes it possible to shield the detection system from view, preserving the esthetic appearance of the lighting device.

According to one feature, the trim comprises a coating (reflective for visible wavelengths) forming the interference filter and comprising a stack of thin layers, some with a high refractive index and others with a low refractive index, the index of the high-index layers being substantially higher than that of the low-index layers. As applicable, the indices of the thin layers with a high refractive index are identical and the indices of the thin layers with a low refractive index are identical.

What is meant by a layer with a high refractive index is a material with a refractive index higher than or equal to 1.7, and a layer with a low refractive index is a material with a refractive index lower than 1.7, preferably lower than or equal to 1.6.

The refractive indices are all measured, as usual, at a wavelength of 550 nm.

Advantageously, the coating is deposited on the face of the trim opposite that facing the detection system, that is to say on the face that faces the interior of the volume accommodating the illumination source.

Preferably, the stack of thin layers is made by alternating at least two consecutive layers, one with a high refractive index and the other with a low refractive index.

Preferably, the stack comprises a layer with a high refractive index in direct contact with (the substrate of) the trim.

Preferably, the layer of the stack that is outermost and opposite the trim is a layer with a high refractive index.

What is meant by a layer in direct contact with another layer, within the meaning of the invention, is that no layer is interposed between the two said layers.

The stack may comprise a tie layer between (the substrate of) the trim and the first layer of the stack deposited on (the substrate of) the trim.

According to another feature, the one or more materials of the layers with a high refractive index and the one or more materials of the layers with a low refractive index are adapted according to the width of the passband in reflection in the visible spectrum of the interference filter (and the width of the passband of the waves emitted by the detection system). In particular, when the layers with a high refractive index are made of one and the same material of index $n_H$, and the layers with a low refractive index are made of one and the same material of index $n_L$, the two materials are chosen such that the ratio of the indices $n_H/n_L$ corresponds to the width of the passband in reflection in the visible spectrum of the interference filter.

According to yet another feature, in order to maximize the reflective power of the stack with a reflective function through constructive and destructive interference, each layer is chosen such that the product of the refractive index of the material of the layer and of the thickness of the layer is proportional to the wavelength centered on the passband in reflection of the interference filter reflecting in the visible spectrum (in particular proportional to the wavelength centered on the passband of the illumination source). This proportionality is, for example, equal to a quarter of the wavelength.

In addition, to ensure substantial reflection over the widest possible visible wavelength range, the materials with high and low refractive indices will be adapted so that the difference between the indices is substantially proportional to the width of said range.

In one preferred example, the stack comprises at least five layers in the following sequence: trim/layer with a high refractive index/layer with a low refractive index/layer with a high refractive index/layer with a low refractive index/layer with a high refractive index.

Advantageously, the thickness of each layer is between 10 nm and 1 µm, particular between 50 nm and 70 nm.

The materials with a low refractive index are based on or chosen from among materials whose refractive index is lower than 1.6 for a wavelength of 550 nm, and in particular, alone or in combination, from among $SiO_2$, $MgF_2$, LiF, $CaF_2$, NaF, $ZrF_4$, $AlF_3$, $Na_5Al_3F_{14}$, $Na_3AlF_6$.

The materials with a high refractive index are based on or chosen from among materials whose refractive index is higher than 1.7 for a wavelength of 550 nm, and in particular, alone or in combination, from among $ZrO_2$, $TiO_2$, $Ta_2O_5$, $Na_2O_5$, $SnO_2$, ZnO, ZnS, $HfO_2$, $Pr_2O_3$, $PrTiO_3$, $La_2O_3$, $Dy_2O_2$, $In_2O_3$, $Nb_2O_5$, $Yb_2O_3$, $Si_3N_4$, AlN.

According to the invention, the lighting device of the invention is in particular used as a headlight or a signaling device. As applicable, the illumination source of the lighting device is designed to produce, alone or in combination with another illumination source, all or part of at least one predetermined regulatory lighting and/or signaling function.

The present invention is now described with the aid of examples that are only illustrative and in no way limit the scope of the invention, and based on the accompanying illustrations, in which:

FIG. 1 shows a schematic sectional view from the side of a vehicle lighting device.

FIG. 2 shows an example of a stack of the reflective coating of the trim.

The lighting device 1 of the invention illustrated in FIG. 1 is, in this example, a front headlight of a motor vehicle. The lighting device 1 comprises, in a closed cavity 10, the front portion 11 of which is equipped with a transparent wall, at least one illumination source 2, and a detection system 3.

The transparent front portion 11 constitutes the surface for the transmission of light out of the lighting device. It preferably comprises one or more lenses.

The detection system 3 is, for example, a detector of objects or obstacles which may be found in front of the lighting device, and therefore in front of the vehicle. The wavelengths of the electromagnetic waves depend on the type of detection system. For example, the wavelength range is 3.5 to 4 mm for a radar system.

The detection system 3 comprises an element for emitting operating waves of the system, an element for receiving the waves and at least one electronic processing module. The emitting and receiving elements and the electronic module might or might not form a one-piece module.

According to the invention, the lighting device 1 comprises a trim 4 arranged in the housing 10 and allowing the detection system 3 to be shielded from view, the detection system thus being placed behind the trim.

According to the invention, the trim 4 forms an interference filter which is transparent in transmission at the wavelengths in the predetermined wavelength range of the electromagnetic waves of the detection system, and is reflective for the wavelengths emitted in the visible spectrum.

The trim 4 comprises, on its face 40 arranged opposite the detection system 3 and facing the interior of the cavity 10, a reflective coating 5. The reflective coating 5 is transparent in transmission at the wavelengths emitted by the detection system 3 and has a reflective property for the wavelengths emitted in the visible spectrum, in particular for the wavelengths emitted by the illumination source 2.

The trim 4 forms, with its reflective coating 5, a reflective mirror which:

prevents what is behind the trim from being seen and thus allows the detection system 3 to be shielded from view so as to maintain the esthetics of the lighting device, constitutes a reflective surface for light rays in the visible spectrum, in particular originating from the illumination source, which are thus ensured to be reflected, and still allows the waves of the detection system to pass through the coating in order to exit the cavity 10.

The reflective coating 5 forms a reflective filter, the passband in reflection of which corresponds to a range of the visible spectrum, the passband in reflection preferably having a reflectance of at least 50% for a passband from 425 to 600 nm, and preferably having a reflectance of at least 80% for a range from 450 to 570 nm and a reflectance of the order of 90% at 500 nm.

With reference to FIG. 2, the reflective coating 5 is a stack of thin layers which are transparent (in the visible) and are deposited on the trim 4.

The trim 4 comprises a substrate made of a material that is preferably transparent, such as glass or plastic material such as polycarbonate (PC) or polymethyl methacrylate (PMMA).

The stack of thin layers comprises layers with a high refractive index $n_H$, in particular made of a material with a refractive index higher than or equal to 1.7, and with a low refractive index $n_L$, in particular made of a material with a refractive index lower than or equal to 1.6.

Preferably, the stack of thin layers is made by alternating at least two consecutive layers, one with a high refractive index and the other with a low refractive index.

The layer with a low refractive index may be thicker than the layer with a high refractive index.

In the example illustrated, the indices of the thin layers with a high refractive index are identical and the indices of the thin layers with a low refractive index are identical, and the stack comprises five layers in the following sequence: trim 4/layer 50 with a high refractive index $n_H$/layer 51 with a low refractive index $n_L$/layer 50 with a high refractive index $n_H$/layer 51 with a low refractive index $n_L$ layer 50 with a high refractive index $n_H$.

The thin layers are deposited in a known manner by means of PVD (physical vapor deposition) using a technique such as electron-beam physical vapor deposition or magnetron sputtering.

The layer with a high refractive index 50 is, for example, made of tantalum pentoxide ($Ta_2O_5$), with an index of 2.1. It has a thickness, for example, of between 50 and 70 nm.

The layer with a low refractive index 51 is, for example, made of silicon dioxide ($SiO_2$), with an index of 1.46. It has a thickness, for example, of between 50 and 70 nm.

Such a stack makes it possible to obtain a reflective filter whose reflection is optimum, in particular with a reflectance higher than 80% for wavelengths from 450 to 570 nm.

Consequently, the lighting device 1 of the invention provides invisible integration of a detection system into a vehicle while ensuring optimal reflection of visible light, in particular by not disrupting the performance of the lighting system.

The invention claimed is:

1. A lighting device for a motor vehicle, comprising:
   a cavity having a front portion which transmits light having wavelengths in the visible spectrum out of the lighting device,
   at least one illumination source arranged in the cavity and configured to emit said light transmitted by the front portion,
   at least one detection system which is arranged in the cavity and separated from the illumination source, and which comprises an emitter and/or a receiver designed to transmit and receive electromagnetic waves in a predetermined wavelength range, and
   a trim arranged in the cavity and behind which the emitter and/or the receiver of the detection system are arranged such that the trim conceals the emitter and/or the receiver when the front portion is viewed from outside the lighting device and a portion of the trim is interposed between the illumination source and the detection system, wherein the trim comprises an interference filter which is transparent in transmission at wavelengths in the predetermined wavelength range and is reflective for the wavelengths transmitted in the visible spectrum such that said light emitted from the illumination source is reflected from the trim and out of the front portion of the lighting device.

2. The lighting device as claimed in claim 1, wherein the trim comprises a coating forming the interference filter and comprising a stack of thin layers with a high refractive index and with a low refractive index, the index of the high-index layers being substantially higher than that of the low-index layers.

3. The lighting device as claimed in claim 2, wherein the indices of the thin layers with a high refractive index are identical and the indices of the thin layers with a low refractive index are identical.

4. The lighting device as claimed in claim 3, wherein the coating is deposited on the face of the trim opposite that facing the detection system.

5. The lighting device as claimed in claim 3, wherein the stack of thin layers is made by alternating at least two consecutive layers, one with a high refractive index and the other with a low refractive index.

6. The lighting device as claimed in claim 3, wherein the layer of the stack that is outermost and opposite the trim is a layer with a high refractive index.

7. The lighting device as claimed in claim 3, wherein the stack comprises a layer with a high refractive index in direct contact with the trim.

8. The lighting device as claimed in claim 2, wherein a layer with a high refractive index is made of a material with a refractive index higher than or equal to 1.7, and a layer with a low refractive index is made of a material with a refractive index lower than 1.7.

9. The lighting device as claimed in claim 2, wherein the coating is deposited on the face of the trim opposite that facing the detection system.

10. The lighting device as claimed in claim 2, wherein the stack of thin layers is made by alternating at least two consecutive layers, one with a high refractive index and the other with a low refractive index.

11. The lighting device as claimed in claim 2, wherein the layer of the stack that is outermost and opposite the trim is a layer with a high refractive index.

12. The lighting device as claimed in claim 2, wherein the stack comprises a layer with a high refractive index in direct contact with the trim.

13. The lighting device as claimed in claim 2, wherein the stack comprises at least five layers in the following sequence: trim/layer with a high refractive index/layer with a low refractive index/layer with a high refractive index/layer with a low refractive index/layer with a high refractive index.

14. The lighting device as claimed in claim 2, wherein the one or more materials of the layers with a high refractive index and the one or more materials of the layers with a low refractive index are adapted according to the width of the passband in reflection in the visible spectrum of the interference filter, in particular when the layers with a high refractive index are made of one and the same material of index $n_H$, and the layers with a low refractive index are made of one and the same material of index $n_L$, the two materials are chosen such that the ratio of the indices $n_H/n_L$ corresponds to the width of the passband in reflection in the visible spectrum of the interference filter.

15. The lighting device as claimed in claim 2, wherein each layer is chosen such that the product of the refractive index of the material of the layer and of the thickness of the layer is proportional to the wavelength centered on the passband in reflection of the interference filter in the visible spectrum.

16. The lighting device as claimed in claim 2, wherein the thickness of each layer is between 10 nm and 1 μm, in particular between 50 nm and 70 nm.

17. The lighting device as claimed in claim 2, wherein the materials with a low refractive index are based on, or chosen from among, alone or in combination, $SiO_2$, $MgF_2$, LiF, $CaF_2$, NaF, $ZrF_4$, $AlF_3$, $Na_5Al_3F_{14}$, $Na_3AlF_6$.

18. The lighting device as claimed in claim 2, wherein the materials with a high refractive index are based on, or chosen from among, alone or in combination, $ZrO_2$, $TiO_2$, $Ta_2O_5$, $Na_2O_5$, $SnO_2$, ZnO, ZnS, $HfO_2$, $Pr_2O_3$, $PrTiO_3$, $La_2O_3$, $Dy_2O_5$, $In_2O_3$, $Nb_2O_5$, $Yb_2O_3$, $Si_3N_4$, AlN.

19. The lighting device as claimed in claim 2, wherein a layer with a low refractive index is made of a material with a refractive index lower than or equal to 1.6.

20. The lighting device as claimed in claim 1, wherein the lighting device is used as a headlight or a signaling device, in particular the illumination source of the lighting device is designed to produce, alone or in combination with another illumination source, all or part of at least one predetermined regulatory lighting and/or signaling function.

* * * * *